United States Patent [19]

Reh

[11] Patent Number: 4,771,220
[45] Date of Patent: Sep. 13, 1988

[54] PICTURE TUBE HEATER SUPPLY CIRCUIT

[75] Inventor: Klaus Reh, Albershausen, Fed. Rep. of Germany

[73] Assignee: Standard Elektrik Lorenz A.G., Stuttgart, Fed. Rep. of Germany

[21] Appl. No.: 824,132

[22] Filed: Jan. 30, 1986

[30] Foreign Application Priority Data

Jan. 30, 1985 [DE] Fed. Rep. of Germany ....... 3503000

[51] Int. Cl.⁴ .............................................. H01J 29/70
[52] U.S. Cl. .................................... 315/411; 358/190
[58] Field of Search ......................... 315/411; 358/190

[56] References Cited

U.S. PATENT DOCUMENTS

| 3,603,732 | 9/1971 | George | 358/190 |
|---|---|---|---|
| 3,783,335 | 1/1974 | Gries | 315/411 |
| 3,798,369 | 3/1974 | Dietch | 358/190 |
| 3,801,856 | 4/1974 | Griepentrog | 315/411 |
| 3,956,669 | 5/1976 | Ciello | 315/411 |
| 3,970,779 | 7/1976 | Takahashi | 315/411 |
| 4,293,801 | 10/1981 | Cook et al. | 358/190 |
| 4,649,325 | 3/1987 | Guerin et al. | 315/411 |

FOREIGN PATENT DOCUMENTS

| 0163235 | 12/1985 | European Pat. Off. . | |
| 0054177 | 5/1981 | Japan | 358/243 |
| 2085270 | 4/1982 | United Kingdom . | |

Primary Examiner—Theodore M. Blum
Assistant Examiner—David Cain
Attorney, Agent, or Firm—Peter C. Van Der Sluys

[57] ABSTRACT

In a television receiver with a drive transformer for the horizontal output stage, the heater voltage for the picture tube is inductively obtained from the drive transformer.

2 Claims, 1 Drawing Sheet

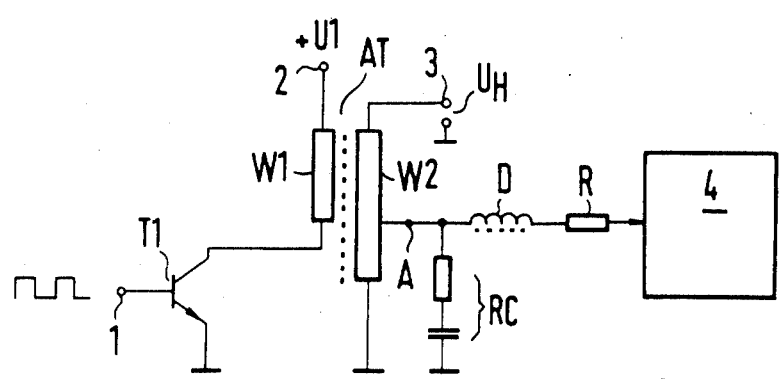

PICTURE TUBE HEATER SUPPLY CIRCUIT

BACKGROUND OF THE INVENTION

The invention pertains to a picture tube heater supply circuit for a television receiver.

A television receiver with a horizontal-deflection circuit drive transformer is disclosed in DE-AS No. 23 22 875. In this television receiver, the horizontal output stage contains thyristors, the retrace thyristor of which is connected to the horizontal oscillator through the drive transformer. The supply-voltage lead to this retrace thyristor includes a transformer from which the heater voltage for the picture tube is taken via a special secondary winding.

SUMMARY OF THE INVENTION

The object of the invention is to provide a simpler way of deriving a heater voltage for the picture tube.

BRIEF DESCRIPTION OF THE DRAWING

An embodiment of the invention will now be explained in more detail with reference to the accompanying drawing, which is a schematic diagram of a drive circuit for the horizontal-deflection circuit.

DETAILED DESCRIPTION

The drive circuit includes a transistor T1 having its base connected to an input terminal 1. The emitter is grounded, and the collector is connected through the primary winding W1 of a drive transformer AT to a terminal 2. The input terminal 1 is presented with a pulse sequence delivered by a horizontal oscillator (not shown). A positive operating voltage U1 is applied to the terminal 2. One end of the secondary winding W2 of the drive transformer AT is grounded. Connected to the tap A of the secondary winding W2 are a grounded RC section and, through a choke D in series with a resistor R, the horizontal output stage 4. The horizontal output stage is of conventional design and contains, for example, a transistor and the horizontal deflection coil.

The secondary winding W2 of the drive transformer AT is designed as an autotransformer, whose upper terminal is connected to a terminal 3. From this terminal 3, the heater voltage $U_H$ for the picture tube (not shown) can be taken. This simple derivation of the heater voltage $U_H$ from the drive transformer AT for the horizontal output stage offers the advantage that the heater voltage can be adjusted with very close accuracy since the drive transformer has a very low turn-to-turn voltage.

What is claimed is:

1. A heater supply circuit for providing a heater voltage to the heater of a picture tube of a television receiver including a horizontal-deflection circuit having a drive transformer, said horizontal-deflection circuit including means for providing said drive transformer with a pulsating current, and terminal means coupled to said drive transformer and adapted for connection to the picture tube heater for providing said heater with said heater voltage from said drive transformer.

2. A heater supply circuit in accordance with claim 1, wherein:
   said drive transformer includes a secondary winding and wherein said terminal means are coupled to said secondary winding of said drive transformer, said secondary winding being designed as an autotransformer.

* * * * *